(12) United States Patent
Yoshimi et al.

(10) Patent No.: US 7,345,114 B2
(45) Date of Patent: Mar. 18, 2008

(54) METHOD FOR PRODUCING CHLORINATED VINYL CHLORIDE RESIN

(75) Inventors: Tomoyuki Yoshimi, Hyogo (JP); Yusuke Kawamura, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 11/654,136

(22) Filed: Jan. 17, 2007

(65) Prior Publication Data

US 2007/0173611 A1    Jul. 26, 2007

(30) Foreign Application Priority Data

Jan. 26, 2006   (JP)   ............... 2006-017259
Jul. 12, 2006   (JP)   ............... 2006-191289

(51) Int. Cl.
*C08C 19/12*   (2006.01)
*C08C 3/02*    (2006.01)

(52) U.S. Cl. ................... 525/331.5; 525/355; 525/356; 525/358

(58) Field of Classification Search ............. 525/331.5, 525/355, 356, 358
See application file for complete search history.

(56) References Cited

U.S. PATENT DOCUMENTS 5,359,011 A   10/1994   Vielhaber et al.

FOREIGN PATENT DOCUMENTS

| JP | 46-17128    | 5/1971 |
| JP | 2001-011116 | 1/2001 |
| JP | 2003-238615 | 8/2003 |
| JP | 2004-099669 | 4/2004 |

*Primary Examiner*—Roberto Rabago
(74) *Attorney, Agent, or Firm*—Hamre, Schumann, Mueller & Larson, P.C.

(57) ABSTRACT

According to the present invention, during or after the process of separating an aqueous solution of hydrochloric acid by-produced from a chlorinated vinyl chloride resin slurry obtained by chlorinating vinyl chloride resin or a copolymer of vinyl chloride and another copolymerizable monomer, hypochlorite is added to the chlorinated vinyl chloride slurry or water-containing resin. Due to this, the concentration of hydrochloric acid in the chlorinated vinyl chloride resin or chlorinated vinyl chloride copolymer resin before drying is reduced, and the problem of removing hydrochloric acid in the subsequent drying treatment is reduced, whereby the problem of corrosion of a drier can be reduced.

14 Claims, 2 Drawing Sheets

METHOD FOR PRODUCING CHLORINATED VINYL CHLORIDE RESIN

BACKGROUND OF THE INVENTION

1. Field of the Invention

The present invention relates to a method for producing chlorinated vinyl chloride resin by chlorinating vinyl chloride or a copolymer resin thereof.

2. Description of Related Art

Chlorinated vinyl chloride resin (hereinafter, referred to as "CPVC") is one of the general-purpose resins having excellent heat resistance. The heat resistance is more advantageous as the amount of chlorine (chlorination degree) contained in the molecules of the CPVC is larger. As a method for producing the CPVC, the following method generally is used: vinyl chloride resin (hereinafter, referred to as "PVC") is suspended in an aqueous medium, and gaseous or liquid chlorine is supplied to the suspension, whereby the PVC is chlorinated. Furthermore, regarding such chlorination, photochlorination using light (UV-light) and thermochlorination using heat are performed industrially (JP 46(1971)-17128 B).

It is considered that the chlorination reaction is composed of the following three processes:

(1) $Cl_2 \rightarrow 2Cl\cdot$ (radical generation reaction)
(2) $PVC+Cl\cdot \rightarrow PVC\cdot +HCl$ (hydrogen abstraction reaction)
(3) $PVC\cdot +Cl\cdot \rightarrow CPVC$ (chlorination reaction)

The process (1) is a radical generation reaction of generating a chlorine radical from chlorine with light or heat. The process (2) is a hydrogen abstraction reaction of abstracting hydrogen from PVC with the chlorine radical. The process (3) is a chlorination reaction of generating CPVC with a polymer radical (PVC.) and the chlorine radical or chlorine. The processes (1) to (3) are represented collectively by the following reaction formula (A):

$$PVC+Cl_2 \rightarrow CPVC+HCl \quad (A)$$

Thus, in the chlorination reaction as shown in the process (A), only about one half of the chlorine material is used for a chlorination reaction, and the other half thereof is consumed for by-producing hydrochloric acid. Therefore, the concentration of hydrochloric acid in a slurry after the chlorination reaction becomes, for example, 5 to 12% by weight with respect to the water in the slurry, with the result that the corrosion of the equipment such as a reactor and a drier becomes remarkable. This makes it necessary to coat the equipment with expensive metal so as to prevent the corrosion of the equipment. Accordingly, there arises an industrial problem that a large amount of water is required for cleaning so as to reduce the problem of removing hydrochloric acid in the drier.

For the above-mentioned purpose, it is advantageous in terms of cost to adopt a process of cleaning out and removing even hydrochloric acid in resin with hot water. However, even with such a process, the amount of hydrochloric acid before drying is about 1,000 ppm, and in order to reduce the problem of removing hydrochloric acid in the drying process, the concentration of hydrochloric acid before drying needs to be set to be 100 ppm or less.

Various attempts have been made so as to reduce the problem of removing hydrochloric acid. For example, a method for using citric acid or various kinds of salts thereof so as to neutralize by-produced hydrochloric acid has been proposed (U.S. Pat. No. 5,359,011). However, according to this method, citric acid or various kinds of salts thereof become impurities, so that a great cost is incurred for using and cleaning them, and in addition, it is difficult to set the remaining amount of hydrochloric acid to be 100 ppm or less.

Furthermore, a method for removing hydrochloric acid using a filter also has been proposed (JP 2003-238615 A). However, even using this method, it is difficult to set the remaining amount of hydrochloric acid to be 100 ppm or less.

Furthermore, a method for generating chlorine with proton acid and hypochlorite, instead of blowing chlorine, thereby performing chlorination (JP 2001-11116 A) or a method for placing hypochlorite during a chlorination reaction with chlorine (JP 2004-99669 A) also has been proposed. Although these methods are capable of reducing the concentration of hydrochloric acid in water, it is difficult to set the remaining amount of hydrochloric acid in resin to be 100 ppm or less.

Thus, in the conventional production of CPVC, there are various industrial problems such as the problem of equipment corrosion caused by hydrochloric acid in a slurry, and the problem of decrease in initial coloring and transparency, and the development of a technique of enhancing the balance thereof has been a long-term subject for those skilled in the art.

SUMMARY OF THE INVENTION

Therefore, with the foregoing in mind, it is an object of the present invention to provide a method for producing chlorinated vinyl chloride resin, in which efficient removal of hydrochloric acid is achieved so as to reduce the problem of removing hydrochloric acid on the equipment, caused by hydrochloric acid by-produced in a chlorination reaction.

In view of the above-mentioned problems, the inventors of the present invention have studied earnestly, thereby achieving the present invention.

A method for producing chlorinated vinyl chloride resin of the present invention is characterized in that, during or after the process of separating an aqueous solution of hydrochloric acid by-produced from a chlorinated vinyl chloride resin slurry obtained by chlorinating vinyl chloride resin or a copolymer of vinyl chloride and another copolymerizable monomer, hypochlorite is added to the chlorinated vinyl chloride resin slurry or water-containing resin.

DETAILED DESCRIPTION OF THE INVENTION

According to the present invention, during or after the process of separating an aqueous solution of hydrochloric acid by-produced from a chlorinated vinyl chloride resin slurry obtained by chlorinating vinyl chloride resin or a copolymer of vinyl chloride and another copolymerizable monomer, hypochlorite is added to the chlorinated vinyl chloride resin slurry or water-containing resin, whereby hydrochloric acid by-produced in a chlorination reaction can be removed efficiently. This can reduce the concentration of hydrochloric acid in the chlorinated vinyl chloride resin or chlorinated vinyl chloride copolymer resin before drying, and reduce the problem of removing hydrochloric acid in the subsequent drying treatment, thereby alleviating the problem of corrosion of a drier, etc.

In the present invention, it is preferable that the pH of the water-containing resin or re-dispersed slurry at 25° C. is set in a range of 3 to 8 by adding hypochlorite.

Furthermore, it is preferable that the temperature of the water-containing resin or re-dispersed slurry when the hypochlorite is added is 40° C. to 90° C.

Furthermore, it is preferable that a basic material is added before the hypochlorite is added.

Furthermore, it is preferable that, after resin granules are separated from the water-containing resin or slurry treated with the hypochlorite by filtration, centrifugation, or sedimentation, the resin granules are dried using a drier.

Vinyl chloride resin that is a material for chlorinated vinyl chloride resin is obtained as a slurry in water or dried powder resin. If the vinyl chloride resin is obtained as a slurry, it is supplied to a chlorination process as it is or after impurities in water are removed once by filtration or the like. If the vinyl chloride resin is dried powder resin, it is slurried again in water and then supplied to a chlorination process.

The chlorination process refers to the process of adding chlorine to the slurried vinyl chloride resin to produce resin having heat resistance. Regarding the chlorination process, photochlorination by irradiating chlorine gas with light (UV-light) while supplying the chlorine gas into a slurry, thereby allowing chlorine to react, and thermochlorination by allowing chlorine to react using heat are performed industrially.

The resin chlorinated in the chlorination process (i.e., a chlorinated vinyl chloride resin slurry) has a large amount of water and by-produced hydrochloric acid removed in the subsequent filtration or centrifugation process, and further sent to a drying process, whereby a product as powder is obtained finally.

The vinyl chloride resin in the present invention refers to a single polymer of vinyl chloride or a copolymer of vinyl chloride and another copolymerizable monomer (e.g., ethylene, propylene, vinyl acetate, allyl chloride, allyl glycidyl ether, an acrylic ester, vinyl ether, etc.). These monomers are subjected to suspension polymerization, using a dispersant such as partially saponified polyvinyl alcohol, methyl cellulose, hydroxypropyl methyl cellulose, or polyethylene oxide, and an oil-soluble polymerization initiator such as lauroyl peroxide, di-2-ethylhexyl peroxyneodecanoate, t-butyl peroxyneodecanoate, or $\alpha, \alpha'$-azobis-2,4-dimethyl valeronitrile. It is preferable that the ratio between vinyl chloride and another copolymerizable monomer is 50% by weight/50% by weight to 99.9% by weight/0.1% by weight for the purpose of exhibiting the heat resistance of the chlorinated vinyl chloride resin. Generally, polyvinyl chloride single resin with a viscosity average polymerization of 350 to 1250 is used preferably. The reason for this is that both the heat resistance and moldability of the chlorinated vinyl chloride resin can be satisfied.

The chlorinated vinyl chloride resin refers to vinyl chloride resin with chlorine added thereto in the chlorination process. It is desirable to obtain chlorinated vinyl chloride resin by chlorinating vinyl chloride resin in a resin concentration of 10 to 40% by weight under aqueous suspension. The resin concentration of 10 to 40% by weight is preferable in terms of the productivity, viscosity stability of an aqueous suspension solution, and uniform miscibility during stirring. The resin concentration of 20 to 35% by weight is more preferable in terms of the productivity and uniform miscibility during stirring. In the case of chlorinating vinyl chloride resin in a resin concentration of less than 10% by weight, although it is necessary to keep a balance with respect to a production cost, the concentration of hydrochloric acid can be reduced further. Thus, this may be an effective method when it is necessary to minimize the concentration of hydrochloric acid. There is no particular limit on the chlorination reaction, and photochlorination by radiating UV-light with a mercury lamp, a chlorination method using a catalyst, a method (thermochlorination) for adding heat, or a combination thereof can be used. The mercury lamp refers to a light source using light radiation generated by arc discharge in mercury vapor in a glass tube. Examples of the mercury lamp include a low-pressure mercury lamp with a mercury pressure of about 1 to 10 kPa during lighting, a high-pressure mercury lamp with a mercury pressure of about 100 to 1000 kPa during lighting, and an ultra-high-pressure mercury lamp with a mercury pressure exceeding 1000 kPa during lighting. Any mercury lamp may be used as long as it can emit UV-light radiation. In the present invention, at least one method selected from those for chlorination using photochlorination, thermochlorination, and a catalyst can be adopted.

Figure 1:
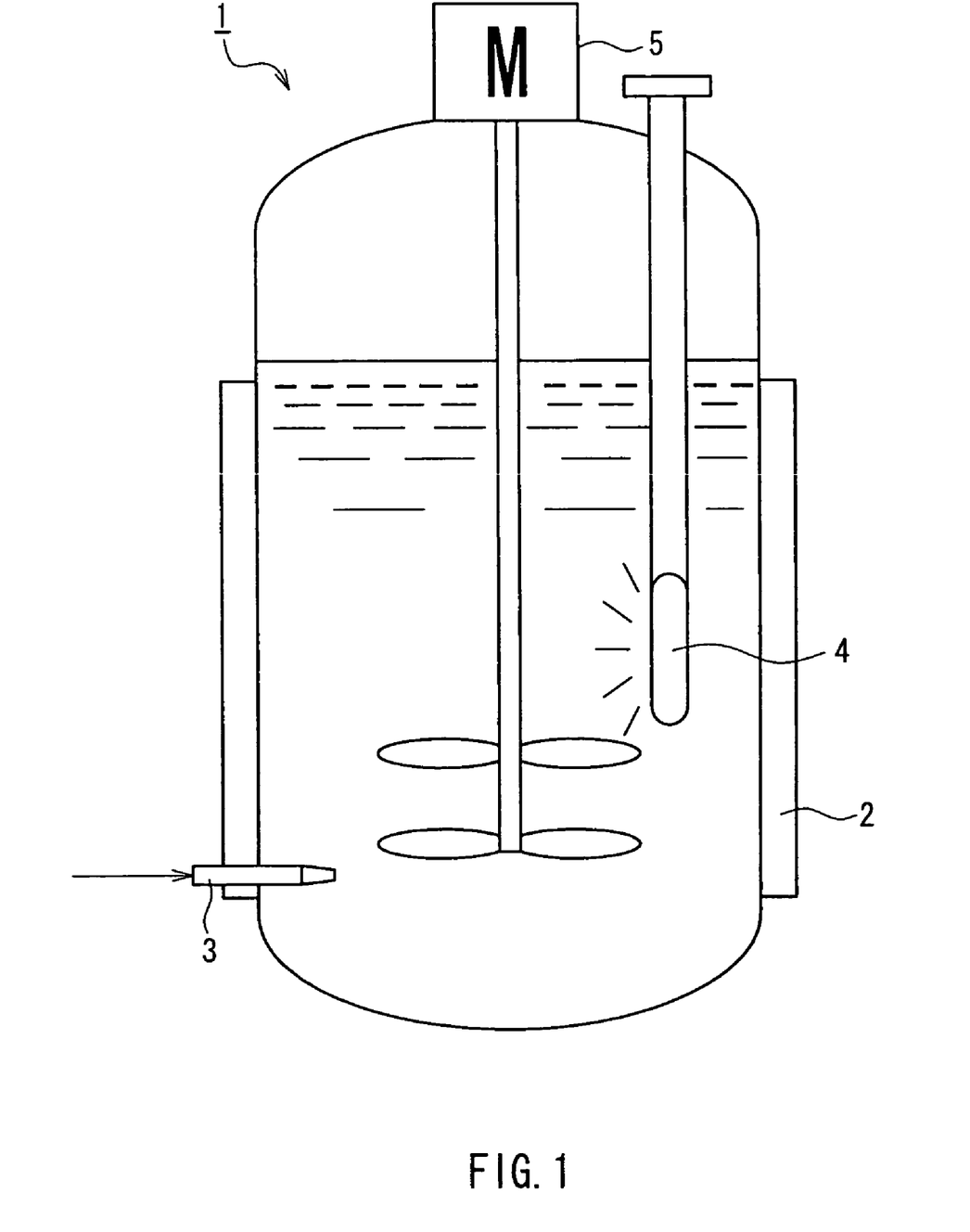
FIG. 1 is a view illustrating a chlorination reaction apparatus in one example of the present invention.

There is no particular limit on a chlorination reaction apparatus for radiating UV-light with a mercury lamp. For example, as shown in FIG. 1, a stirrer 5, a cooling jacket 2, a chlorine supply device 3, and a mercury lamp 4 only need to be attached to a reaction apparatus 1. Inside the reactor, a large amount of hydrochloric acid is by-produced, so that a tank coated with acid-resistant metal or a glass lined tank is used preferably.

In the present invention, chlorine to be supplied to an aqueous medium may be in a gaseous state or a liquid state. However, it is preferable to supply gaseous chlorine to an aqueous medium in terms of the ease of handling.

The resin slurry in an aqueous suspension state thus obtained refers to a chlorinated vinyl chloride resin slurry.

In the present invention, the term "separation" refers to an operation of separation into the water-containing resin and a by-produced hydrochloric acid aqueous solution, using a separation apparatus. Furthermore, the resin obtained in the separation apparatus is referred to as "water-containing resin", and an aqueous solution in a state where hydrochloric acid by-produced when chlorine is added to vinyl chloride resin in the chlorination process is dissolved in a chlorinated vinyl chloride resin slurry as an aqueous solution is referred to as a "by-produced hydrochloric acid aqueous solution". For pre-treatment of resin before hypochlorite is added, an apparatus is required for separation into water-containing resin and a by-produced hydrochloric acid aqueous solution, so as to enhance the effect of hypochlorite. Examples of the apparatus include various kinds of filters and centrifuges. The function of enhancing the efficiency of cleaning hydrochloric acid by injecting water into the separation apparatus may be provided, or hypochlorite added in the present invention may be supplied to the apparatus. There is no particular limit on a filter, and a pressure filter, a vacuum filter, or the like can be used. Furthermore, in order to enhance the effect of water elimination by filtration, a filter press may be used. There is no particular limit on a centrifuge as long as it has the effect of eliminating water by a centrifugal force, and a vertical centrifuge with a rotation shaft being vertical, or a horizontal centrifuge with a rotation shaft being horizontal can be used. There is no particular limit on the water content of the water-containing resin after separation of water. It is effective to set the water content to be 10 to 50% by weight with respect to the water-containing resin in terms of the efficient removal of hydrochloric acid. Furthermore, it is more preferable that the water content is 10 to 35% by weight, because the efficiency of removing hydrochloric acid is enhanced. As hypochlorite used in the present invention, sodium hypochlorite, potassium hypochlorite, calcium hypochlorite, or the like is used. However, sodium hypochlorite is used preferably in terms of the ease of handling, production cost, and the like.

There is no particular limit on a method for adding hypochlorite. A method for supplying hypochlorite with a metering pump to an apparatus for separation into water-containing resin and a by-produced hydrochloric acid aqueous solution, a method for providing a stirring tank downstream of the separation apparatus, and mixing the water-containing resin with hypochlorite in the stirring tank, or a method for slurrying by adding water to the stirring tank when mixing the water-containing resin with hypochlorite, followed by stirring, and re-dispersing resin in water may be used. In terms of the uniformity of mixing, the slurrying method is preferable. Furthermore, before adding hypochlorite after the separation, water may be added to slurry the resin again. The amount of water used for slurrying is preferably 100 parts by weight to 10,000 parts by weight with respect to 100 parts by weight of the resin component of the water-containing resin. In terms of the uniform dispersion of the water-containing resin in water and production cost, the amount of water of 100 parts by weight to 1,000 parts by weight is more preferable. Furthermore, in order to stabilize the pH during treatment, a hypochlorite aqueous solution may be added intermittently or continuously.

There is no particular limit on an effective chlorine concentration of hypochlorite to be added. In terms of production cost, 1% by weight to 16% by weight is preferable, and 5% by weight to 16% by weight is more preferable in terms of production cost and ease of handling. The effective chlorine concentration as used herein refers to the weight of chlorine that functions as hypochlorite among chlorine components in the solution. For example, a sodium hypochlorite aqueous solution with an effective chlorine concentration of 13% by weight indicates that 13% by weight of chlorine atoms are contained in a sodium hypochlorite aqueous solution (in other words, a sodium hypochlorite aqueous solution containing 27.3% by weight of sodium hypochlorite). As a method for measuring an effective chlorine concentration, iodometric titration most generally is performed, and for example, an effective chlorine concentration can be quantified by the following method. Test water containing effective chlorine is set be weakly acidic, and potassium iodide is added to the test water, whereby iodine is liberated. The iodine is titrated with a sodium thiosulfate solution that is a reducing agent with starch being an indicator, and the effective chlorine concentration in the test water is obtained from the titer. Although there is no particular limit on the amount of hypochlorite to be added, the amount in a range of 0.002-fold to 0.1-fold with respect to the CPVC resin is preferable for setting the concentration of hydrochloric acid in the water-containing resin before drying to be 100 ppm, and the amount in a range of 0.002-fold to 0.05-fold is more preferable in terms of production cost. Depending upon the amount of hypochlorite to be added, there may be inconvenience to the quantification in the case of supplying hypochlorite with a pump or the like. In such a case, hypochlorite may be supplied in a concentration equal to or lower than the above. Alternatively, in the case of the above-mentioned slurrying, a method for producing a diluent solution (1% by weight or less) of hypochlorite, and thereafter mixing the solution with the water-containing resin may be used.

The pH in the present invention refers to a value measured in accordance with Japan Industrial Standard pH measurement method (JIS Z 8802 1984). The measurement value of pH refers to a value obtained by placing a collected sample in a container such as a beaker, and measuring the pH after confirming that the sample temperature reaches 25° C. in a water bath heated to 25° C. There is no particular limit on the pH to be adjusted by adding hypochlorite, as long as the object of the present invention can be achieved. The pH is preferably 1 to 12 in terms of the material for the equipment, production cost, and safety, and is more preferably 3 to 11 in terms of the reactivity between hydrochloric acid and hypochlorite.

Before hypochlorite is added, various kinds of basic materials can be used for adjusting the pH. There is no particular limit on the basic material. Examples of the basic material include hydroxides such as caustic soda, potassium hydroxide, and calcium hydroxide; alkaline inorganic salts such as sodium carbonate, potassium carbonate, sodium silicate, and potassium silicate; and ammonia. Among them, caustic soda is preferable in terms of cost. These basic materials may be used as they are or as an aqueous solution.

The pH of the chlorinated vinyl chloride resin slurry or the water-containing resin generated by the production method of the present invention is preferably 3 to 11, more preferably 3 to 8, and most preferably 3 to 7 in a measurement value at 25° C.

If the pH of the chlorinated vinyl chloride resin slurry or the water-containing resin to be generated is in a range of 3 to 8, the cost of production equipment can be reduced, and the amount of hypochlorite to be used can be suppressed to be low.

Furthermore, in the case of a slurry, a pH electrode for direct measurement is immersed in a slurry, whereby the pH of the slurry can be measured. In the case of water-containing resin, a small amount of pure water is added to the water-containing resin, and a pH electrode is immersed in the resultant water-containing resin, whereby the pH of the water-containing resin is estimated from the value measured with the pH electrode by the following expression (1).

$$(\text{pH of water-containing resin}) = (\text{measured pH}) + \log(V1/(V1+V2)) \qquad (1)$$

$V1$=Water amount in water-containing resin (ml)

$V2$=Added water amount (ml)

The temperature at which hypochlorite is added refers to the temperature at which hypochlorite is added to the water-containing resin or the chlorinated vinyl chloride resin slurry, and the temperature during the treatment with hypochlorite. This temperature is not particularly limited; however, it is preferably 0° C. to 95° C. because the operation includes water. In terms of the time required for the reaction between hydrochloric acid and hypochlorite, and the production cost required for decomposition of hypochlorite or the like, the temperature is preferably 40° C. to 95° C., and more preferably 60° C. to 95° C.

Examples of the apparatus for separating the water-containing resin of the chlorinated vinyl chloride resin after the treatment with hypochlorite from water before drying include various kinds of filters and centrifuges. The separation apparatus provided with the function of cleaning can subject the dehydrated resin to further water-injection cleaning and dehydration again, so that cleaning with satisfactory efficiency can be performed. There is no particular limit on a filter, and a pressure filter, a vacuum filter, or the like can be used. Furthermore, in order to enhance the effect of eliminating water by filtration, a filter press may be used. There is no particular limit on a centrifuge as long as it has the effect of eliminating water by a centrifugal force. Specifically, a vertical centrifuge with a rotation shaft being vertical, or a horizontal centrifuge with a rotation shaft being horizontal can be used. Although not particularly limited, a centrifuge preferably is used in terms of the ease of taking out water-containing resin and ease of production. It also may be possible to use a method for slurrying again with water after separation, cleaning hypochlorite, other generated salts, and remaining hydrochloric acid, and thereafter, separating the water-containing resin from water, using the separation apparatus again. There is no particular limit on the water content of the water-containing resin after the operation. However, it is effective to set the water content to be 10 to 50% by weight with respect to the water-containing resin in terms of the energy efficiency during drying. Furthermore, the water content of 10 to 35% by weight is more preferable because the energy efficiency is enhanced further during drying.

Furthermore, for drying water in the water-containing resin, various kinds of driers can be used. For example, by using a groove-type stirring drier or the like in the case of a conduction and heat conduction system, and by using a fluidized-bed drier or the like in the case of a hot air receiving system, a product granule can be obtained. Furthermore, an extruder may be provided after the driver, whereby the water-containing resin may be pelletted, or a deaeration function may be provided at the extruder, whereby the water-containing resin may be pelleted at the same time as the evaporation of water. Although there is no particular limit on the drying system, it is preferable to use the fluidized-bed drier in terms of production cost.

EXAMPLES

Hereinafter, the specific embodiment of the present invention will be described in detail by way of examples. However, the present invention is not limited to the examples.

In the examples, the concentration of hydrochloric acid refers to the concentration with respect to a resin solid content, and is quantified by titrating a sample (which is obtained by dissolving 1.0 g of resin in a target sample in 40 ml of tetrahydrofuran at 25° C. to extract hydrochloric acid in the resin, and adding 30 ml of a mixed solution (methanol: water=5:1 (volume ratio)) to reprecipitate a resin component), using 0.01 N of a caustic soda aqueous solution, calculating a titer at a time when the pH reaches 7.0, and subtracting a titer in the absence of the sample (blank) from the calculated titer.

The pH of a slurry in the examples refers to a value obtained by collecting a part of a slurry sample, placing it in a beaker or the like, and measuring the pH after confirming that a sample temperature reaches 25° C. in a water bath heated to 25° C. D-51S (produced by Horiba Seisakusho Co., Ltd.) was used for measurement.

(Evaluation Method of Initial Coloring)

In the examples, the initial coloring was evaluated by the following method. With respect to 100 parts by weight of the obtained CPVC dry powder, 10 parts by weight of a shock-resistant reinforcing agent ("Kane Ace B-22", Product name, produced by Kaneka Corporation), 3 parts by weight of a dibutyltin mercapto stabilizer, and 1.2 parts by weight of paraffin wax were mixed. The mixture was kneaded with a roll at 175° C. for 3 minutes to form a sheet with a thickness of 0.6 mm. The sheet was overlapped and pressed at 180° C. for 10 minutes, whereby a press plate with a thickness of 3 mm was obtained. The press plate was inspected for initial coloring.

The initial coloring was inspected by visually observing the press plate in accordance with the following standard.
A: Neutral light yellow
B: Light yellow
C: Yellow Example 1

In a chlorination reactor with an internal volume of 50 L equipped with a stirring wing, a cooling jacket, and a UV-light irradiation lamp, 15 kg of vinyl chloride resin (polymerization degree: 670), and 35 kg of ion exchange water were placed. Vacuum degassing and nitrogen substitution in the reactor were performed for a predetermined period of time while stirring. After that, chlorine gas was blown into the system, followed by irradiation with UV-light, whereby a chlorination reaction was started. The temperature and pressure in the reactor were controlled to be 50° C. and 0.02 MPa, respectively. The concentration of hydrochloric acid was measured with time. At a time when the chlorination degree reached 64% by weight based on a previously created calibration curve, the irradiation with UV-light was stopped to complete the chlorination reaction, whereby a chlorinated vinyl chloride resin slurry was obtained.

Then, 1.5 L of the obtained chlorinated vinyl chloride resin slurry was filtered with a Buchner funnel to obtain water-containing resin. The slurry was subjected to vacuum filtration at 25° C. for one minute under a pressure of about 300 mmHg, using a suction filtration bottle and a diaphragm vacuum pump. The water content of the obtained water-containing resin was about 25% by weight with respect to the water-containing resin. The water-containing resin was placed in a glass stirring tank with an internal volume of 2 L, and water was added thereto to set the slurry volume to be 1.5 L. The resultant slurry was placed in a constant temperature water tank, and the internal temperature was set to be 80° C. After that, a sodium hypochlorite aqueous solution (effective chlorine concentration: 13% by weight) was added to the slurry to set the pH thereof to be 6.5. After that, the sodium hypochlorite aqueous solution was dropped under monitoring so that the pH reached 6.5. The addition of the sodium hypochlorite aqueous solution was completed when 60 minutes had elapsed from the commencement of the addition of the sodium hypochlorite aqueous solution, and the resultant mixture was filtered with a Buchner funnel again to obtain water-containing resin. The water-containing resin was subjected to vacuum filtration at 25° C. for one minute under a pressure of about 300 mmHg, using a suction filtration bottle and a diaphragm vacuum pump. The water content of the water-containing resin thus obtained was about 25% by weight with respect to the water-containing resin.

At this time, the concentration of hydrochloric acid in the water-containing resin one hour after the addition of the sodium hypochlorite aqueous solution was 70 ppm. Table 1 shows the results.

The water-containing resin thus obtained was dried with a box-type drier at a hot air temperature of 120° C. until the water content became 0.1% by weight or less. Consequently, it was confirmed that the concentration of hydrochloric acid in the dried powder resin thus obtained was 70 ppm, and hydrochloric acid was not volatilized during drying.

Furthermore, the dried powder resin was evaluated based on the above-mentioned evaluation method of initial coloring. The initial coloring was A (neutral light yellow).

Example 2

Example 2 was performed in the same way as in Example 1 except that the internal temperature during the treatment with sodium hypochlorite was set to be 70° C.

At this time, the concentration of hydrochloric acid in the water-containing resin one hour after the addition of the sodium hypochlorite aqueous solution was 70 ppm. Table 1 shows the results.

When the water-containing resin thus obtained was dried in the same way as in Example 1, it was confirmed that the concentration of hydrochloric acid in the obtained dried powder was similarly 70 ppm, and hydrochloric acid was not volatilized during drying.

Example 3

Example 3 was performed in the same way as in Example 1 except that the internal temperature during the treatment with sodium hypochlorite was set to be 65° C.

At this time, the concentration of hydrochloric acid in the water-containing resin one hour after the addition of the sodium hypochlorite aqueous solution was 70 ppm. Table 1 shows the results.

When the water-containing resin thus obtained was dried in the same way as in Example 1, it was confirmed that the concentration of hydrochloric acid in the obtained dried powder was similarly 70 ppm, and hydrochloric acid was not volatilized during drying.

Example 4

Example 4 was performed in the same way as in Example 1 except that the pH during the treatment with sodium hypochlorite was set to be 4.0.

At this time, the concentration of hydrochloric acid in the water-containing resin one hour after the addition of the sodium hypochlorite aqueous solution was 70 ppm. Table 1 shows the results.

When the water-containing resin thus obtained was dried in the same way as in Example 1, it was confirmed that the concentration of hydrochloric acid in the obtained dried powder was similarly 70 ppm, and hydrochloric acid was not volatilized during drying.

Example 5

Example 5 was performed in the same way as in Example 1 except that after the pH was set to be 2.0 with a caustic soda aqueous solution, sodium hypochlorite was added to set the pH during the treatment with sodium hypochlorite to be 6.5.

At this time, the concentration of hydrochloric acid in the water-containing resin one hour after the addition of sodium hypochlorite was 70 ppm. Table 1 shows the results.

When the water-containing resin thus obtained was dried in the same way as in Example 1, it was confirmed that the concentration of hydrochloric acid in the obtained dried powder was similarly 70 ppm, and hydrochloric acid was not volatilized during drying.

Example 6

Example 6 was performed in the same way as in Example 1 except that, in Example 1, after 1.5 L of the chlorinated vinyl chloride resin slurry was subjected to vacuum filtration for one minute, 250 parts by weight of ion exchange water was added to the water-containing resin as a resin cleaning solution to filter the water-containing resin again.

The water content of the obtained water-containing resin was about 25% by weight with respect to the water-containing resin.

At this time, the concentration of hydrochloric acid in the water-containing resin one hour after the addition of sodium hypochlorite was 70 ppm. Table 1 shows the results.

The obtained water-containing resin was dried with a box-type drier at a hot air temperature of 120° C. until the water content became 0.1% by weight or less. Consequently, it was confirmed that the concentration of hydrochloric acid thus obtained was 70 ppm, and hydrochloric acid was not volatilized during drying.

Furthermore, the dried powder resin was evaluated based on the above-mentioned evaluation method of initial coloring. The initial coloring was A (neutral light yellow).

Example 7

Example 7 was performed in the same way as in Example 1 except that potassium hypochlorite was used as a treatment agent.

At this time, the concentration of hydrochloric acid in the water-containing resin one hour after the addition of potassium hypochlorite was 70 ppm. Table 1 shows the results.

Example 8

Example 8 was performed in the same way as in Example 1 except that calcium hypochlorite was used as a treatment agent.

At this time, the concentration of hydrochloric acid in the water-containing resin one hour after the addition of sodium hypochlorite was 70 ppm. Table 1 shows the results.

Example 9

Example 9 was performed in the same way as in Example 1 except that the pH during the treatment with sodium hypochlorite was set to be 3.0.

At this time, the concentration of hydrochloric acid in the water-containing resin one hour after the addition of sodium hypochlorite was 70 ppm. Table 1 shows the results.

When the water-containing resin thus obtained was dried in the same way as in Example 1, it was confirmed that the concentration of hydrochloric acid in the obtained dried powder was similarly 70 ppm, and hydrochloric acid was not volatilized during drying.

Example 10

Example 10 was performed in the same way as in Example 1 except that the pH during the treatment with sodium hypochlorite was set to be 8.0.

At this time, the concentration of hydrochloric acid in the water-containing resin one hour after the addition of sodium hypochlorite was 90 ppm. Table 1 shows the results.

When the water-containing resin thus obtained was dried in the same way as in Example 1, it was confirmed that the concentration of hydrochloric acid in the obtained dried powder was similarly 70 ppm, and only 20 ppm of hydrochloric acid was volatilized during drying.

Comparative Example 1

When the chlorinated vinyl chloride resin slurry obtained in Example 1 was filtered with a Buchner funnel, pure water in an amount of 10-fold with respect to the resin was added to the water-containing resin after filtration, whereby the water-containing resin was filtered again. The water-containing resin was subjected to vacuum filtration at 25° C. for one minute under a pressure of about 300 mmHg, using a suction filtration bottle and a diaphragm vacuum pump. The water content of the obtained water-containing resin was about 25% by weight with respect to the water-containing resin. The concentration of hydrochloric acid contained in the water-containing resin was 800 ppm. The resultant water-containing resin was placed in a glass stirring tank with an internal volume of 2 L, and pure water was added to set the slurry volume to be 1.5 L. The slurry was placed in a constant temperature water tank, followed by stirring, with the internal temperature being set to be 80° C.

At this time, the concentration of hydrochloric acid in the water-containing resin after the elapse of one hour was 460 ppm. Even after the elapse of three hours, the concentration of hydrochloric acid was 220 ppm. Table 1 shows the results.

When the water-containing resin thus obtained was dried in the same way as in Example 1, it was confirmed that the concentration of hydrochloric acid in the obtained dried powder was 70 ppm, and 150 ppm of hydrochloric acid was volatilized during drying.

Furthermore, the dried power resin was evaluated by the above-mentioned evaluation method of initial coloring. The initial coloring was B (light yellow).

Figure 2:
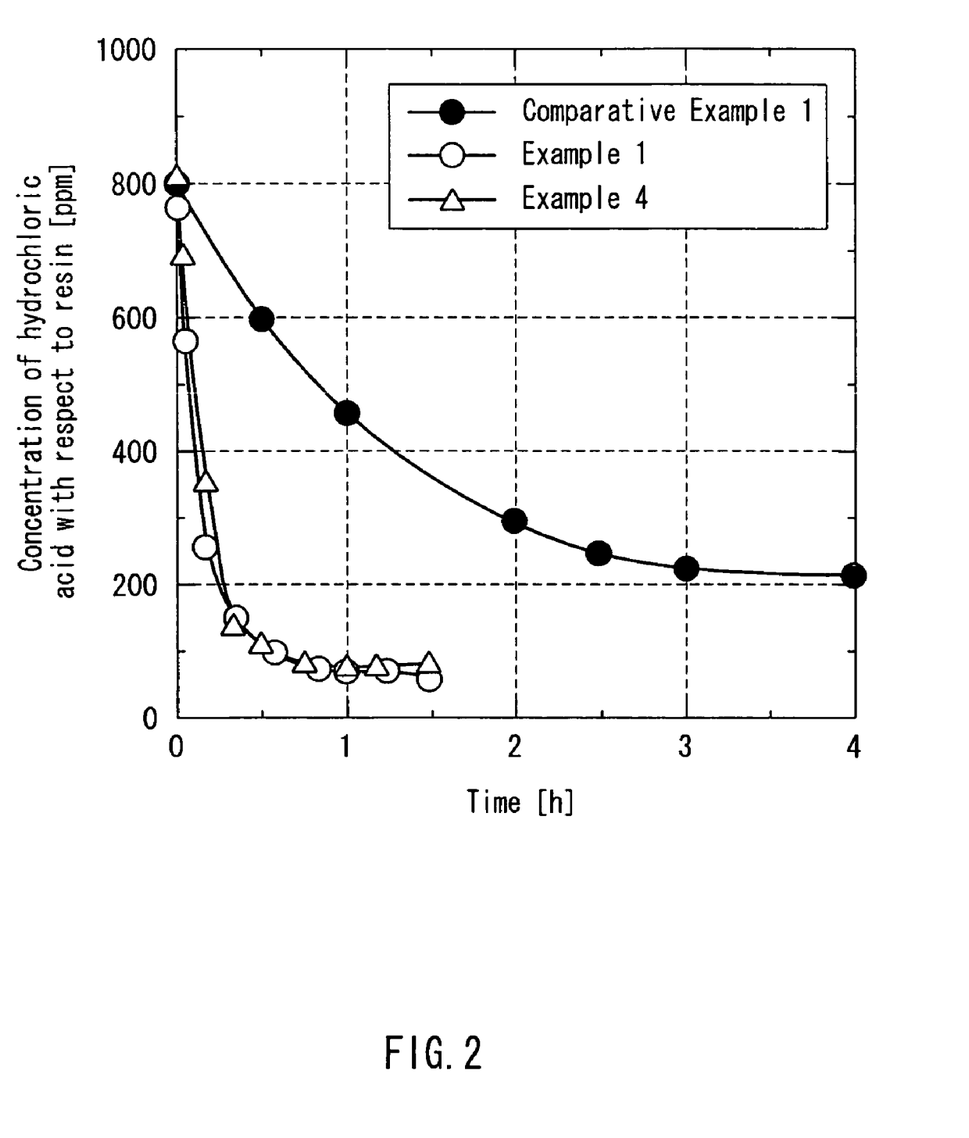
FIG. 2 is a diagram illustrating a change with time in concentration of hydrochloric acid in resins in Examples 1 and 4 of the present invention and Comparative Example 1.

Furthermore, FIG. 2 is a graph illustrating a change with time in concentration of hydrochloric acid in the resins in Examples 1, 4 and Comparative Example 1. It is understood that the concentration of hydrochloric acid in Examples 1 and 4 of the present invention decreased largely in a short period of time, compared with Comparative Example 1.

Comparative Example 2

Comparative Example 2 was performed in the same way as in Comparative Example 1 except that the internal temperature was set to be 110° C.

At this time, the concentration of hydrochloric acid in the water-containing resin after the elapse of one hour was 350 ppm. Even after the elapse of three hours, the concentration of hydrochloric acid was 220 ppm. Table 1 shows the results.

When the water-containing resin thus obtained was dried in the same way as in Example 1, it was confirmed that the concentration of hydrochloric acid in the obtained dried powder was 70 ppm, and 150 ppm of hydrochloric acid was volatilized during drying.

Comparative Example 3

Comparative Example 3 was performed in the same way as in Example 1 except that a caustic soda aqueous solution was used instead of the sodium hypochlorite aqueous solution.

At this time, the concentration of hydrochloric acid in the water-containing resin one hour after the addition of the caustic soda aqueous solution was 400 ppm. Even after the elapse of three hours, the concentration of hydrochloric acid was 190 ppm. Table 1 shows the results.

When the water-containing resin thus obtained was dried in the same way as in Example 1, it was confirmed that the concentration of hydrochloric acid in the obtained dried powder was 70 ppm, and 120 ppm of hydrochloric acid was volatilized during drying.

Furthermore, the dried power resin was evaluated by the above-mentioned evaluation method of initial coloring. The initial coloring was B (light yellow).

Comparative Example 4

Comparative Example 4 was performed in the same way as in Example 1 except that a sodium carbonate aqueous solution was used instead of the sodium hypochlorite aqueous solution At this time, the concentration of hydrochloric acid in the water-containing resin after the elapse of one hour from the addition of the sodium carbonate aqueous solution was 450 ppm. Even after the elapse of three hours, the concentration of hydrochloric acid was 210 ppm. Table 1 shows the results.

When the water-containing resin thus obtained was dried in the same way as in Example 1, it was confirmed that the concentration of hydrochloric acid in the obtained dried powder was 70 ppm, and 140 ppm of hydrochloric acid was volatilized during drying.

Furthermore, the dried power resin was evaluated by the above-mentioned evaluation method of initial coloring. The initial coloring was B (light yellow).

Comparative Example 5

Comparative Example 5 was performed in the same way as in Example 1, except that a sodium citrate aqueous solution was used instead of the sodium hypochlorite aqueous solution.

At this time, the concentration of hydrochloric acid in the water-containing resin after the elapse of one hour from the addition of the sodium citrate aqueous solution was 500 ppm. Even after the elapse of three hours, the concentration of hydrochloric acid was 220 ppm. Table 1 shows the results.

When the water-containing resin thus obtained was dried in the same way as in Example 1, it was confirmed that the concentration of hydrochloric acid in the obtained dried powder was 70 ppm, and 150 ppm of hydrochloric acid was volatilized during drying.

Comparative Example 6

Comparative Example 6 was performed in the same way as in Comparative Example 1 except that, in Comparative Example 1, after the chlorinated vinyl chloride resin slurry was subjected to vacuum filtration for one minute, 250 parts by weight of ion exchange water further was added to the water-containing resin as a resin cleaning solution to filter the water-containing resin again.

At this time, the concentration of hydrochloric acid contained in the water-containing resin was 800 ppm. The water-containing resin was placed in a glass stirring tank with an internal volume of 2 L, and pure water was added thereto to set the slurry volume to be 1.5 L. The resultant slurry was placed in a constant temperature water tank, followed by stirring, with the internal temperature being set to be 80° C. The concentration of hydrochloric acid in the water-containing resin after the elapse of one hour was 460 ppm. Even after the elapse of three hours, the concentration of hydrochloric acid was 220 ppm. Table 1 shows the results.

Furthermore, the dried powder resin was evaluated based on the above-mentioned evaluation method of initial coloring. The initial coloring was B (light yellow).

Comparative Example 7

Comparative Example 7 was performed in the same way as in Comparative Example 3 except that, in Comparative Example 3, after the chlorinated vinyl chloride resin slurry was subjected to vacuum filtration for one minute, 250 parts by weight of ion exchange water further was added to the water-containing resin as a resin cleaning solution to filter the water-containing resin again.

At this time, the concentration of hydrochloric acid of the water-containing resin after the elapse of one hour from the addition of the caustic soda aqueous solution was 400 ppm. Furthermore, even after the elapse of three hours, the concentration of hydrochloric acid of the water-containing resin was 190 ppm. Table 1 shows the results.

When the water-containing resin thus obtained was dried in the same way as in Example 1, it was confirmed that the concentration of hydrochloric acid in the obtained dried powder was 70 ppm, and 150 ppm of hydrochloric acid was volatilized during drying.

Furthermore, the dried powder resin was evaluated based on the above-mentioned evaluation method of initial coloring. The initial coloring was B (light yellow).

Comparative Example 8

Comparative Example 8 was performed in the same way as in Comparative Example 4 except that, in Comparative Example 4, after the chlorinated vinyl chloride resin slurry was subjected to vacuum filtration for one minute, 250 parts by weight of ion exchange water further was added to the water-containing resin as a resin cleaning solution to filter the water-containing resin again.

At this time, the concentration of hydrochloric acid of the water-containing resin after the elapse of one hour from the addition of the sodium carbonate aqueous solution was 450 ppm. Furthermore, even after the elapse of three hours, the concentration of hydrochloric acid of the water-containing resin was 210 ppm. Table 1 shows the results.

When the water-containing resin thus obtained was dried in the same way as in Comparative Example 4, it was confirmed that the concentration of hydrochloric acid in the obtained dried powder was 70 ppm, and 140 ppm of hydrochloric acid was volatilized during drying.

Furthermore, the dried powder resin was evaluated based on the above-mentioned evaluation method of initial coloring. The initial coloring was B (light yellow).

Comparative Example 9

Comparative Example 9 is an additional experiment of the example described in JP 2001-11116 A, which is compared with the example of the present invention.

In a chlorination reactor with an internal volume of 50 L equipped with a stirring wing and a cooling jacket, 5 kg of vinyl chloride resin (polymerization degree: 670), 12 kg of ion exchange water, and 21.8 kg of a sodium hypochlorite aqueous solution (effective chlorine concentration: 13%) were placed. Vacuum degassing and nitrogen substitution in the reactor were performed for a predetermined period of time while stirring. After that, 8.3 kg of a hydrochloric acid aqueous solution (35% by weight) was added, whereby a chlorination reaction was started. The temperature in the reactor was controlled to be 60° C. After the elapse of 6 hours, the chlorination reaction was completed to obtain a chlorinated vinyl chloride resin slurry. At this time, the sodium hypochlorite did not remain in the resin slurry.

Then, 1.5 L of the obtained chlorinated vinyl chloride resin slurry was filtered with a Buchner funnel. After the filtration, pure water in an amount of 10-fold with respect to the resin was added to the water-containing resin, whereby the water-containing resin was filtered again. The water-containing resin was subjected to vacuum filtration at 25° C. for one minute under a pressure of about 300 mmHg, using a suction filtration bottle and a diaphragm vacuum pump. The water content of the obtained water-containing resin was about 25% by weight with respect to the water-containing resin. The concentration of hydrochloric acid contained in the water-containing resin was 800 ppm. The water-containing resin was placed in a glass stirring tank with an internal volume of 2 L, and pure water was added thereto to set the slurry volume to be 1.5 L. The resultant slurry was placed in a constant temperature water tank, followed by stirring, with the internal temperature being set to be 80° C.

At this time, the concentration of hydrochloric acid in the water-containing resin after the elapse of one hour was 460 ppm. Even after the elapse of three hours, the concentration of hydrochloric acid was 220 ppm. Table 1 shows the results.

The water-containing resin thus obtained was dried in the same way as in Example 1. Consequently, it was confirmed that the concentration of hydrochloric acid in the dried powder resin thus obtained was 70 ppm, and 150 ppm of hydrochloric acid was volatilized during drying.

Comparative Example 10

Comparative Example 10 is an additional experiment of the example described in JP 2004-99669 A, which is compared with the example of the present invention.

In a chlorination reactor with an internal volume of 50 L equipped with a stirring wing, a cooling jacket, and a UV-light irradiation lamp, 7.5 kg of vinyl chloride resin (polymerization degree: 670), 42.5 kg of ion exchange water, and 2.1 kg of a sodium hypochlorite aqueous solution (effective chlorine concentration: 13% by weight)(sodium hypochlorite: 0.58 kg) were placed. Vacuum degassing and nitrogen substitution in the reactor were performed for a predetermined period of time while stirring. After that, chlorine gas was blown to the system, followed by irradiation with UV-light, whereby a chlorination reaction was started. The temperature and pressure in the reactor were controlled to be 50° C. and 0.02 MPa, respectively. The concentration of hydrochloric acid was measured with time. At a time when the chlorination degree reached 64% by weight based on a previously created calibration curve, the irradiation with UV-light was stopped to complete the chlorination reaction, whereby a chlorinated vinyl chloride resin slurry was obtained. At this time, sodium hypochlorite did not remain in the resin slurry.

Then, 1.5 L of the obtained chlorinated vinyl chloride resin slurry was filtered with a Buchner funnel. After the filtration, pure water in an amount of 10-fold with respect to the resin was added to the water-containing resin, whereby the water-containing resin was filtered again. The water-containing resin was subjected to vacuum filtration at 25° C. for one minute under a pressure of about 300 mmHg, using a suction filtration bottle and a diaphragm vacuum pump. The water content of the obtained water-containing resin was about 25% by weight with respect to the water-containing resin. The concentration of hydrochloric acid contained in the water-containing resin was 800 ppm. The water-containing resin was placed in a glass stirring tank with an internal volume of 2 L, and pure water was added thereto to set the slurry volume to be 1.5 L. The resultant slurry was placed in a constant temperature water tank, followed by stirring, with the internal temperature being set to be 80° C.

At this time, the concentration of hydrochloric acid in the water-containing resin after the elapse of one hour was 460 ppm. Even after the elapse of three hours, the concentration of hydrochloric acid was 220 ppm. Table 1 shows the results.

The water-containing resin thus obtained was dried in the same way as in Example 1. Consequently, it was confirmed that the concentration of hydrochloric acid in the dried powder resin thus obtained was 70 ppm, and 150 ppm of hydrochloric acid was volatilized during drying.

As described above, it was confirmed that the concentrations of hydrochloric acid in the CPVC resins (i.e., water-containing resins) before drying obtained in Examples 1 to 10 are low, whereby the problem of removing hydrochloric acid in the subsequent drying treatment was reduced. The initial coloring also was improved.

In Comparative Examples 1-10, the concentration of hydrochloric acid remaining in the resin after drying was 70 ppm. The reason for this is not clear; however, the initial coloring in any of Comparative Examples 1-10 was unsatisfactory, unlike Examples 1-10 of the present invention.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes

TABLE 1

| Experiment No. | Additive | Temperature (° C.) | pH | Concentration of hydrochloric acid in water-containing resin (ppm - with respect to resin solid content) One hour after | Concentration of hydrochloric acid in water-containing resin (ppm - with respect to resin solid content) Three hours after | Initial coloring |
|---|---|---|---|---|---|---|
| Example 1 | sodium hypochlorite | 80 | 6.5 | 70 | — | A |
| Example 2 | sodium hypochlorite | 70 | 6.5 | 70 | — | A |
| Example 3 | sodium hypochlorite | 65 | 6.5 | 70 | — | A |
| Example 4 | sodium hypochlorite | 80 | 4.0 | 70 | — | A |
| Example 5 | sodium hypochlorite (pH is partially adjusted with caustic soda) | 80 | 6.5 | 70 | — | A |
| Example 6 | sodium hypochlorite (further cleaned with ion exchange water during filtration) | 80 | 6.5 | 70 | — | A |
| Example 7 | potassium hypochlorite | 80 | 6.5 | 70 | — | A |
| Example 8 | calcium hypochlorite | 80 | 6.5 | 70 | — | A |
| Example 9 | sodium hypochlorite | 80 | 3.0 | 70 | — | A |
| Example 10 | sodium hypochlorite | 80 | 8.0 | 90 | — | A |
| Comparative Example 1 | none | 80 | 2.0 | 460 | 220 | B |
| Comparative Example 2 | none | 110 | 2.0 | 350 | 220 | B |
| Comparative Example 3 | caustic soda | 80 | 6.5 | 400 | 190 | B |
| Comparative Example 4 | sodium carbonate | 80 | 6.5 | 450 | 210 | B |
| Comparative Example 5 | sodium citrate | 80 | 6.5 | 500 | 220 | B |
| Comparative Example 6 | none | 80 | 2.0 | 460 | 220 | B |
| Comparative Example 7 | caustic soda | 80 | 6.5 | 400 | 190 | B |
| Comparative Example 8 | sodium carbonate | 80 | 6.5 | 450 | 210 | B |
| Comparative Example 9 | Chlorination reaction is performed with hydrochloric acid and sodium hypochlorite | 80 | 2.0 | 460 | 220 | B |
| Comparative Example 10 | While chlorination reaction is performed with chlorine, sodium hypochlorite is added | 80 | 5.0 | 460 | 220 | B |

The invention claimed is:

1. A method for producing chlorinated vinyl chloride resin, wherein during or after a process of separating an aqueous solution of hydrochloric acid, which is by-produced from a chlorinated vinyl chloride resin slurry obtained by chlorinating vinyl chloride resin or a copolymer of vinyl chloride and another copolymerizable monomer, hypochlorite is added to the chlorinated vinyl chloride resin slurry or water-containing resin.

2. The method for producing chlorinated vinyl chloride resin according to claim 1, wherein pH of the chlorinated vinyl chloride resin slurry or the water-containing resin at 25° C. is set to be in a range of 3 to 8 by adding the hypochlorite.

3. The method for producing chlorinated vinyl chloride resin according to claim 2, wherein the pH during treatment is stabilized by intermittently adding an aqueous solution of the hypochlorite to the chlorinated vinyl chloride resin slurry or the water-containing resin.

4. The method for producing chlorinated vinyl chloride resin according to claim 2, wherein the pH during treatment is stabilized by continuously adding an aqueous solution of the hypochlorite to the chlorinated vinyl chloride resin slurry or the water-containing resin.

5. The method for producing chlorinated vinyl chloride resin according to claim 1, wherein a temperature of the water-containing resin or a re-dispersed slurry when the hypochlorite is added is 0° C. to 95° C.

6. The method for producing chlorinated vinyl chloride resin according to claim 1, wherein the hypochlorite is at least one selected from the group consisting of sodium hypochlorite, potassium hypochlorite, and calcium hypochlorite.

7. The method for producing chlorinated vinyl chloride resin according to claim 1, wherein, when chlorine is added to slurried vinyl chloride resin, the chlorination is performed by at least one method selected from the group consisting of a photochlorination method by irradiating the chlorine with light while supplying the chlorine into the slurry, thereby allowing the chlorine to react, a thermochlorination method by allowing chlorine to react using heat, and a chlorination method using a catalyst.

8. The method for producing chlorinated vinyl chloride resin according to claim 1, wherein a water content of the water-containing resin before the chlorination is in a range of 10 to 50% by weight with respect to the water-containing resin.

9. The method for producing chlorinated vinyl chloride resin according to claim 1, wherein an effective chlorine concentration of the hypochlorite in the chlorinated vinyl chloride resin slurry or the water-containing resin is in a range of 1% by weight to 16% by weight.

10. The method for producing chlorinated vinyl chloride resin according to claim 1, wherein pH is adjusted by adding a basic material before adding the hypochlorite.

11. The method for producing chlorinated vinyl chloride resin according to claim 10, wherein the basic material is at least one selected from the group consisting of caustic soda, potassium hydroxide, calcium hydroxide, sodium carbonate, potassium carbonate, sodium silicate, potassium silicate, and ammonia.

12. The method for producing chlorinated vinyl chloride resin according to claim 1, wherein the water-containing resin or slurry treated with the hypochlorite further is subjected to filtration, centrifugation, or sedimentation to separate resin granules, and thereafter, during a drying process, the resin granules are dried using a drier.

13. The method for producing chlorinated vinyl chloride resin according to claim 1, wherein the vinyl chloride and another copolymerizable monomer are at least one selected from the group consisting of ethylene, propylene, vinyl acetate, allyl chloride, allyl glycidyl ether, an acrylic ester, and vinyl ether.

14. The method for producing chlorinated vinyl chloride resin according to claim 1, wherein a ratio between the vinyl chloride and another copolymerizable monomer is in a range of 50% by weight/50% by weight to 99.9% by weight/0.1% by weight.

* * * * *